Patented Apr. 7, 1925.

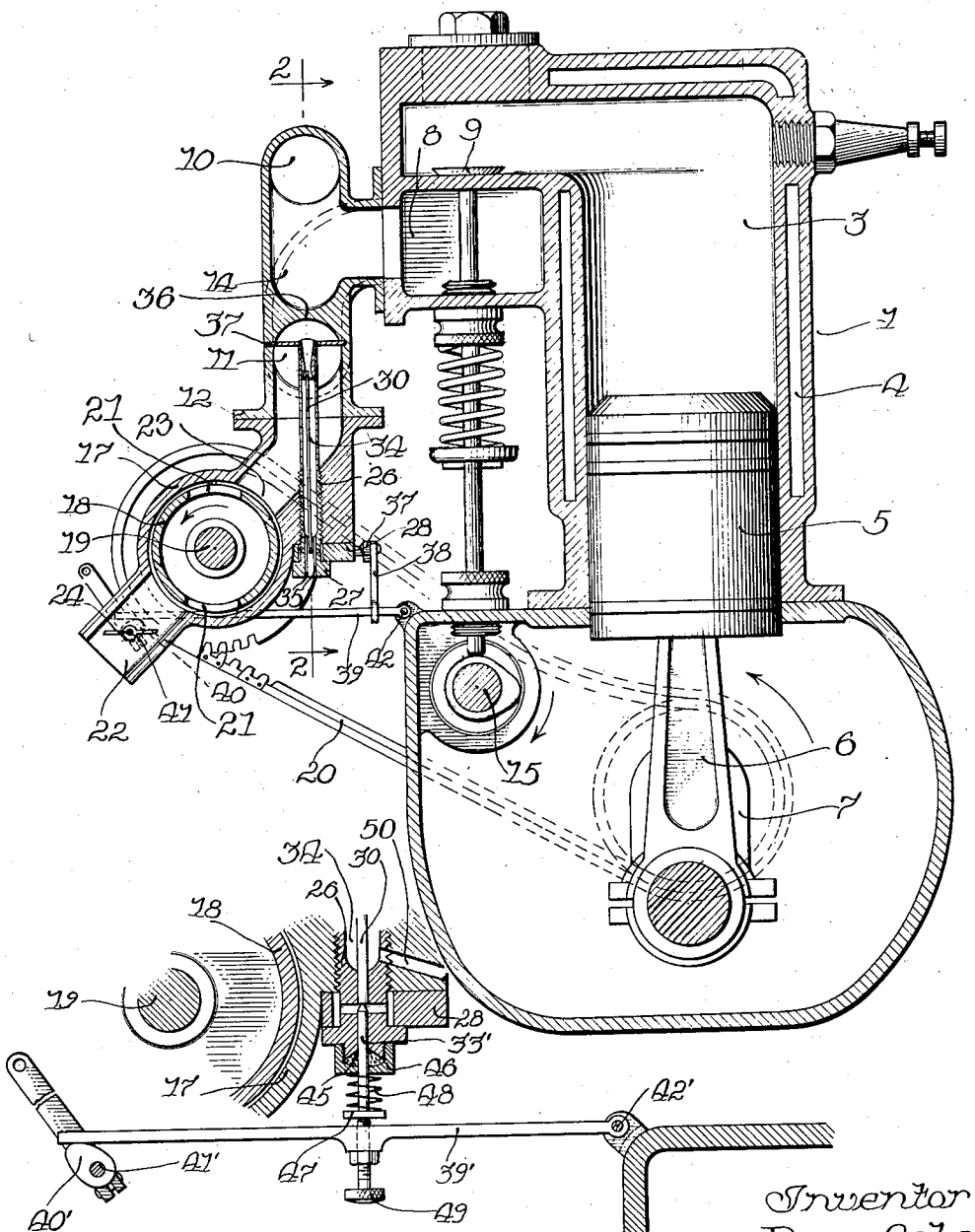

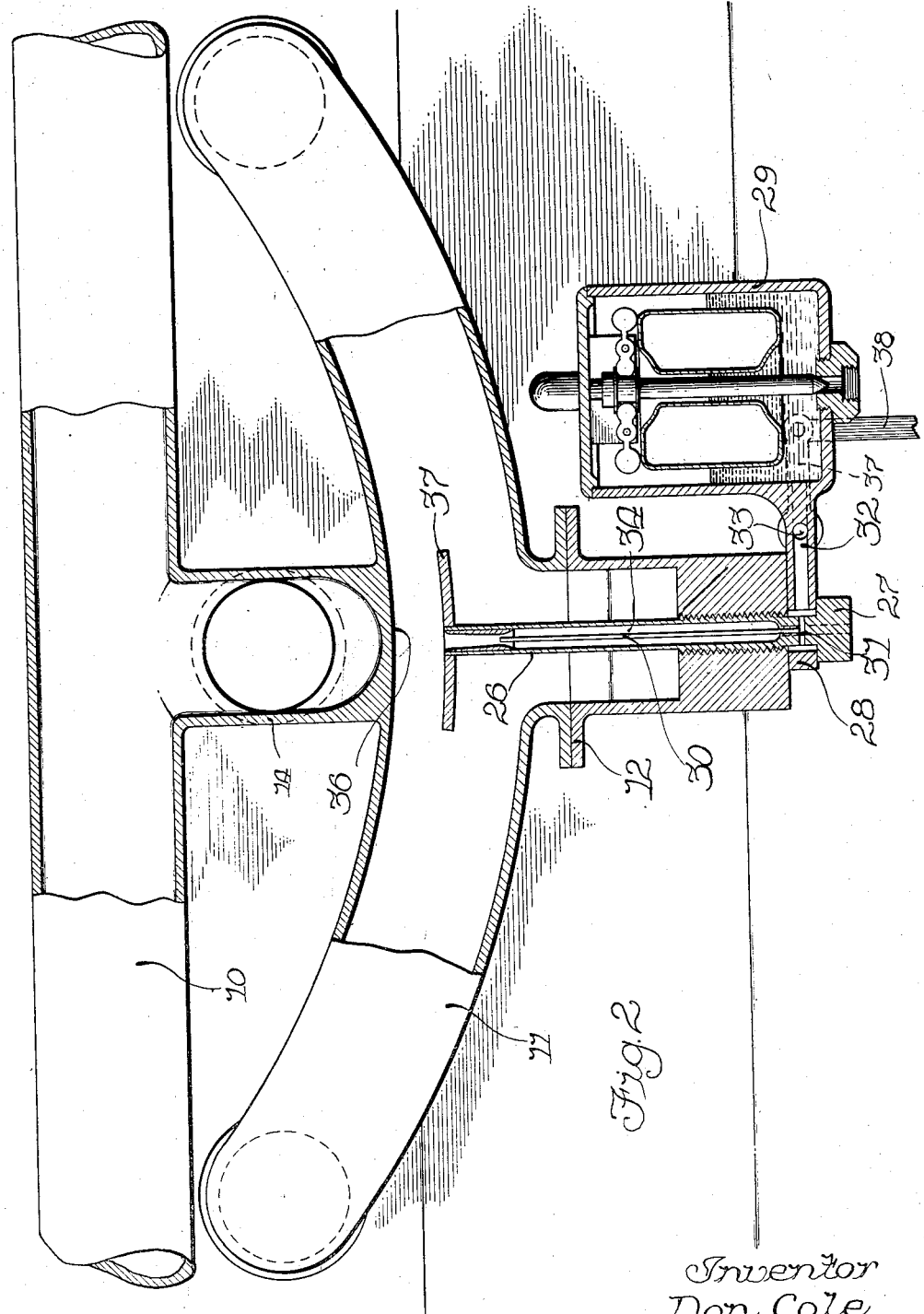

1,532,384

UNITED STATES PATENT OFFICE.

DON COLE, OF CHICAGO, ILLINOIS, ASSIGNOR OF ONE-HALF TO JOHN A. DIENNER, OF CHICAGO, ILLINOIS.

INTERNAL-COMBUSTION ENGINE.

Application filed May 15, 1919. Serial No. 297,185.

*To all whom it may concern:*

Be it known that I, DON COLE, a citizen of the United States, residing at Chicago, in the county of Cook and State of Illinois, have invented a certain new and useful Improvement in Internal-Combustion Engines, of which the following is a full, clear, concise, and exact description, reference being had to the accompanying drawings, forming a part of this specification.

My invention relates to internal combustion engines and particularly to a novel method of and means for burning fuel of relatively high boiling point in such engines.

In my copending applications Serial Numbers 253,140 and 253,141, I have disclosed the novel principles of subjecting the fuel in the cylinder of the engine to reduced pressure and then mixing the same with air. In my copending application, Serial Number 287,452, I have provided for first atomizing the fuel and subjecting the same to reduced pressure in the intake manifold and then toward the end of the suction stroke causing a sudden rush of air to sweep the contents of the intake manifold into the cylinder. Owing to the very high suction of the jet during the first half of the intake stroke, the fuel is drawn into the intake and atomized by the suction. The exhaust manifold is provided with an envelope or heating loop about the intake manifold which aids materially in vaporizing and mixing the fuel.

I have since observed that although it is highly desirable to bring the particles of fuel into contact with a heated area, that contact of the inrushing air with the heated area is undesirable for various reasons, i. e., the thermal efficiency of the heated area is materially decreased by contact of the inrushing relatively cold air therewith. Heating and the consequent expansion of the inrushing air is further undesirable in that the density of the air thus admitted to the cylinders of the engine is reduced.

The present invention aims to provide for insulating the relatively cold inrushing air from the heated area, whereby not only the thermal efficiency of the heated area is effectively maintained to insure thorough vaporization of the particles of fuel, but the inrushing air not being heated is consequently not expanded and a more complete relatively denser charge of air is thereby admitted to the cylinders of the engine.

My invention aims further to provide for insulating the inrushing air from the end of the fuel nozzle or jet; thereby not only insuring contact of the particles of fuel with the heated area before mixing with the inrushing air, but at the same time making the supply of fuel dependent upon the suction in the intake manifold at all times and not subject to appreciable variations due to the effect of the inrushing air thereupon.

In order that those skilled in the art may be fully acquainted with the nature and scope of my invention I shall describe a specific embodiment of my invention in connection with the accompanying drawings which form a part of the present specification, and wherein:

Figure 1 shows in vertical cross section an illustrative embodiment of my invention;

Figure 2 is a vertical sectional view taken on the line 2—2 of Figure 1; and

Figure 3 illustrates a modified form of fuel controlling valve.

The engine which I have illustrated is of substantially the type disclosed in my copending application, Serial Number 287,452, filed April 4th, 1919, i. e., typical of any four cycle, four cylinder engine. I have shown the same as comprising a cylinder casting 1 and a crank casing 2, suitably bolted together.

The cylinder casting 1 comprises a plurality of cylinders 3, having suitable water jackets 4. Each cylinder is provided with the usual piston 5 connected by a connecting rod 6 to a crank shaft 7.

Each cylinder is provided with a suitable exhaust valve 9 and intake valve (not shown) for controlling the exhaust from and intake to the cylinder 3. A suitable cam shaft 15, driven from the crank shaft 7 operates the valves to control the working of the engine. The exhaust passage 8 is controlled by the exhaust valve 9 and is connected by a suitable exhaust manifold 10 to the exhaust pipe of the engine.

An intake manifold 11 is connected to the intake ports of the cylinders and is also provided with a flange 12 such as have heretofore been provided for the attachment of a carburetor. The exhaust manifold 10 is provided with an elbow extension 14 intermediate its ends, the lower end of which elbow extension 14 is formed integral with or connected in any suitable manner to the intake manifold 11 to provide a heated area or "hot spot" in the upper wall of the intake manifold for thoroughly vaporizing the fuel, as will be pointed out later.

A valve casing member 17 is secured by means of a suitable bolting flange to the flange 12 of the intake manifold 11, which flange 12 surrounds the inlet opening of the manifold. A rotary valve member 18 fits closely in the cylindrical inner surface of the valve casing 17. The valve member 18 is mounted upon a shaft 19, driven by suitable gearing and a connecting chain 20 from the crank shaft 7. The valve member 18 is provided with ports 21, which ports 21 cooperate upon rotation of the valve member 18 with an air inlet passage 22 and a port 23 leading to the intake manifold 11.

The air inlet passage 22 is provided with a suitable throttle valve 24 for controlling the volume of mixture fed to the cylinders for each stroke and for controlling the speed of the engine.

The outer wall of the intake manifold 11 is provided with a longitudinal slot in substantial alignment with the juncture of the elbow extension 14 of the exhaust manifold 10 therewith, for the reception of a baffle plate 37 transversely thru the intake manifold adjacent the hot spot 36. The inner edge of the baffle plate 37 engages in a scarf or notch provided in the opposite or inner wall of the intake manifold whereby the baffle plate is retained securely in place. This baffle plate 37 is provided with an aperture or opening for the reception of the upper free end of a fuel feed nozzle.

The valve casing member 17 is drilled and tapped to receive the fuel feed nozzle which fuel feed nozzle comprises a hollow threaded sleeve member 26 having a head 27 at its lower end, which head 27 is adapted to clamp the extension 28 of the float chamber bowl 29 against the bottom of the valve casing member 17. An axial tube or sleeve 30 is threaded or otherwise suitably mounted in the threaded sleeve member 26. The threaded sleeve 26 is provided with a port 31 (Figure 2) adjacent its lower end to place the lower open end of the axial tube 30 in communication with the fuel passageway 32, which fuel passageway 32 communicates with the interior of the float chamber 29. A valve 33 controls the feed of liquid fuel from the float chamber 29 to the axial tube 30. The upper open end of the tube 30 terminates in the restricted portion provided adjacent the upper end of the threaded sleeve member 26. This restricted portion may have the form of a Venturi tube. The passageway 34 in the threaded sleeve member 26 opens at its lower end thru suitable ports 35 (Figure 1) to atmosphere. It will now be apparent that suction upon the end of the threaded sleeve member 26 causes the liquid fuel to rise in the axial tube 30 and to discharge thru the upper open end thereof into the restricted portion of the sleeve 26 and to be sprayed with the small quantity of air admitted into the passageway 34 thru the ports 35 against the heated area or hot spot 36, causing thorough atomization and vaporization of the liquid fuel as it is discharged into the intake manifold 11.

The valve 33 is preferably—though not necessarily—connected to the throttle valve 24, as by means of links 37 and 38 and a pivoted lever 39 so that the amount of fuel that can be fed to the axial tube 30 is reduced as the throttle valve 24 is closed. The free end of the pivoted lever 39 cooperates with a cam 40 mounted to rotate in unison with the throttle valve shaft 41. The valve 33 is actuated by the pivoted lever 39 thru the links 37 and 38. Rotation of the throttle valve shaft 41—in a counterclockwise direction to open the throttle 24—will, thru the cam 40 lift the lever 39 about its pivot 42, rotating the metering valve 33 to open the same.

In the modification shown in Figure 3 the metering pin 33' cooperates directly with the lower open end of the axial tube 30. A tight joint is formed about the metering pin 33' by packing 45 held firmly in place by means of a suitable gland 46. The lower end of the metering pin 33' is provided with an annular head 47 between which annular head 47 and the gland 46 a spring 48 is arranged about the metering pin 33'. The pivoted lever 39' is provided with an adjusting screw 49 adapted for cooperation with the annular head 47 of the metering pin 33' whereby the amount of fuel that can be fed to the axial tube 30 for a given throttle opening can be varied. In this case rotation of the throttle valve shaft 41' in a clockwise direction—to close the throttle, will thru the cam 40' lift the lever 39' about its pivot 42', moving the metering pin 33' upwardly by cooperation of the adjusting screw 49 with the head 47 thereof, thereby decreasing the quantity of fuel fed to the axial tube 30 as the throttle is closed. The air inlet for the passageway 34 in the sleeve 26 is in this form provided by drilling one or more openings 50 thru the adjacent sidewalls of the body member 17 and thru the lower end of the sleeve 26.

It will now be apparent that upon opening of the intake valve of the engine the atomizing conduit or sleeve 26 being open, kerosene is drawn from the float chamber 29 and is projected in a fine spray against the hot spot 36 and into the intake manifold 11, which intake manifold is under a relatively high suction, as clearly pointed out in my co-pending application, Serial Number 287,452, filed April 4, 1919. Thus the particles of kerosene are effectively vaporized and are subjected to an action of atomization by the high velocity of the air thru the ports 35 and passageway 34. As the piston 5 descends, sufficient fuel is drawn from the axial tube 30 to furnish fuel for one stroke. The rotary intake valve is thereafter opened by the cooperation of the port 21, with the air inlet passage 22, and the port 23 leading to the intake manifold 11. As the intake and manifold 11 are under a relatively high suction, and as the area of port opening is quite large, the thoroughly vaporized charge of fuel held within the intake manifold is suddenly packed into the cylinder with sufficient air to support combustion, and thereafter the air intake valve is closed.

It will now be apparent that this inrush of air is effectively insulated from the hot spot 36 by the baffle plate 37 and the thermal efficiency of the hot spot is thereby maintained for vaporizing the fuel sprayed thereagainst. The air is not appreciably heated and therefore is not appreciably expanded, but is by-passed to either side of the baffle plate 37 and mixes with the vaporized fuel in the intake pipe until the mixture is packed into the cylinder. The air is not heated and is consequently not expanded by contact with the hot spot 36, but the fuel is. Consequently the mixture is drawn into the cylinder in a relatively dense but thoroughly comingled state and a full charge is thereby assured.

I believe that I am the first to cause the injected fuel to strike a heated surface in the intake conduit without permitting the air for supporting combustion to strike the same. This is a feature of great value whether used with the charge forming mechanism of the type I have specifically described or with mechanisms of other type and I aim to claim the same broadly.

It will now be apparent that I have provided a novel method of feeding an internal combustion engine which produces ideal conditions for atomization of the fuel, mixing of the charge and efficient combustion of the same. The particular arrangement of the fuel nozzle, throttle valve, etc., is immaterial. I have made tests of an engine embodying my invention to determine the power of the same in comparison with the power of the engine operated with gasoline and the proper carburetor, according to the prior art and find that the performance of the engine embodying my invention exceeds the performance upon gasoline with regard to the actual power developed on the test block.

While I have described my invention in connection with the details of a particular embodiment I do not intend thereby to limit the invention to such details as I am aware and contemplate that modifications and changes may be made without departing from the invention, which is set out in the appended claims.

I claim:

1. The method of feeding an internal combustion engine having a piston, cylinder, valves for exhaust and intake, intake pipe and a suction controlled fuel feeding and atomizing device opening into the intake pipe, which consists in subjecting the atomizing device to high suction to cause fluid fuel to be injected into contact with a heated area in the intake pipe, admitting sufficient air for combustion into said intake pipe and insulating by deflection the air thus admitted from said heated area.

2. The method of feeding an internal combustion engine which comprises injecting fluid fuel relatively free of air into a relatively high vacuum and into contact with a heated area to thoroughly atomize the same, then admitting sufficient air for combustion into said relatively high vacuum and passing the air in close proximity to the heated area but insulating the same therefrom by retaining it out of contact therewith to secure a complete and even charge and at the same time maintain the thermal efficiency of the heated area.

3. The method of feeding an internal combustion engine which comprises closing the outer end of the intake pipe during the suction stroke of the piston to create a relatively high vacuum injecting fluid fuel into said relatively high vacuum through said intake pipe and into contact with a heated area, opening the intake pipe to atmosphere to cause a rush of air through the same sufficient for supporting combustion of the injected fuel to throw the air and fuel into the engine cylinder and insulating by deflection said inrushing air in said pipe from said heated area.

4. In combination, an engine cylinder having a piston, intake and exhaust valves, a crank shaft, and an intake pipe, said intake pipe having a heated portion, a baffle adjacent said heated portion to deflect air entering said intake pipe from said heated portion, a fuel nozzle discharging through said baffle against said heated portion, and a valve at the outer end of said pipe adapted to be opened only when a relatively high suction has been created in said intake pipe.

5. In an internal combustion engine, a cylinder, a piston operating in said cylinder, a crank with which said piston is connected, inlet and exhaust valves for said cylinder, an intake pipe communicating with the inlet valve, a suction controlled fuel feeding and atomizing device opening into the intake pipe, a heated area adjacent the discharge end of said suction controlled fuel feeding device and a baffle plate for deflecting the air admitted through said intake pipe from said heated area.

6. In combination, an internal combustion engine, an exhaust pipe for said engine, an intake pipe for said engine, said exhaust pipe being arranged to heat a portion of said intake pipe, a suction controlled fuel feeding and atomizing device adapted for injecting fluid fuel into contact with said heated portion and means for deflecting the air admitted thru said intake pipe from said heated portion and from the open end of said fuel feeding and atomizing device.

7. In combination, an intake pipe having air admission means and having means to heat a portion of said pipe, means to project a spray of liquid fuel against said heated portion, deflecting means for maintaining substantially the major portion of air out of contact with said heated portion, and an automatically operating valve controlling the admission of air to said pipe at a point anterior to the fuel projecting means.

8. The method of preparing a charge of fuel for an engine, which comprises subjecting a conduit to suction, heating a portion of the conduit, projecting fuel against the heated portion of said conduit, and passing a current of air through said conduit adjacent the heated surface, but out of contact with the same.

9. The method of preparing a charge of fuel for an internal combustion engine, having an intake pipe with a hot spot which comprises projecting liquid fuel into contact with the said hot spot, and causing a current of air to carry the vaporized fuel from said hot spot and simultaneously deflecting the current of air out of contact with said hot spot.

10. In an intake pipe, means for heating part of the same, means for admitting air to said pipe, means for projecting liquid fluid against said heated part prior to admixture with the main volume of air, and a baffle supported out of contact with said heated part so as to be thermally insulated therefrom for deflecting the main volume of air from said heated part but permitting the same to pass adjacent thereto to pick up the fuel vaporized thereby, said baffle insulating the main volume of air against undue heat absorption.

11. In combination, an engine cylinder having pistons, intake and exhaust valves, a crank shaft, an intake pipe having a heated portion, a fuel nozzle discharging into said pipe, against said heated portion, a valve controlling the outer end of said intake pipe to admit air thereto but out of contact with said heated portion when a relatively high vacuum has been established in said pipe, and a separate air vent for said nozzle.

12. In combination, an intake conduit for an internal combustion engine, a pipe for conveying air to the intake port of the engine, said pipe comprising two portions lying at an angle to each other, means for heating a wall of one portion adjacent the angle, a shield or baffle on the atmospheric side of said heated wall and means for projecting fuel against the heated wall.

13. In combination, an internal combustion engine having intake and exhaust manifolds connecting to a multiplicity of cylinders, a hot spot in said intake manifold, means for conducting exhaust gases from said exhaust manifold adjacent to said hot spot for heating the same, a rich mixture conduit discharging against said hot spot, means for supplying liquid fuel to said rich mixture conduit, a restricted air inlet to said rich mixture conduit, whereby the mixture created in said conduit is highly saturated with fuel and of insufficient air content for combustion at any normal engine speed, a main air conduit operating to supply air to said intake manifold at all normal engine speeds, said normal air supply mixing with the rich mixture discharged from said hot spot for making up the combustible mixture for all normal engine speeds, and means for preventing said normal air supply from contacting with said hot spot.

14. In combination, an intake passageway comprising a heated fuel vaporizing surface therein, a fuel feeding jet, a first air passageway supplying a primary flow of air past said fuel feeding jet, said air passageway and said jet being arranged to project the resulting mixture against said fuel vaporizing surface, said air passageway being restricted to supply a comparatively small volume of air to said jet insufficient to support combustion at intermediate and high engine speeds, whereby a relatively small volume of air is allowed to strike said fuel vaporizing surface, and a second air passageway for admitting a secondary volume of air for mixing with the relatively rich primary mixture after this mixture has been brought into contact with said fuel vaporizing surface, said second air passageway admitting air to said intake passageway at substantially all engine speeds and supplying the requisite volume of air for supporting combustion at intermediate and high engine speeds.

In witness whereof I hereunto subscribe my name this 13th day of May, A. D. 1919.

DON COLE.